(No Model.)

J. A. WERNER.
SCALE ATTACHMENT.

No. 449,986. Patented Apr. 7, 1891.

Witnesses
W. T. Keene,
F. L. Middleton.

Inventor
John A. Werner,
by Ellis Spear
Atty.

UNITED STATES PATENT OFFICE.

JOHN A. WERNER, OF CHICAGO, ILLINOIS.

SCALE ATTACHMENT.

SPECIFICATION forming part of Letters Patent No. 449,986, dated April 7, 1891.

Application filed December 20, 1890. Serial No. 375,331. (No model.)

*To all whom it may concern:*

Be it known that I, JOHN A. WERNER, a citizen of the United States of America, residing at Chicago, in the county of Cook and State of Illinois, have invented certain new and useful Improvements in Scale Attachments, of which the following is a specification.

My invention relates to scales, and particularly to platform-scales, the object being to provide means operating automatically to compensate for the weight of the ordinary scoop or receptacle when articles of bulk are to be weighed not requiring the scoop.

The invention consists in the devices and combination of devices hereinafter specified.

Figure 1:
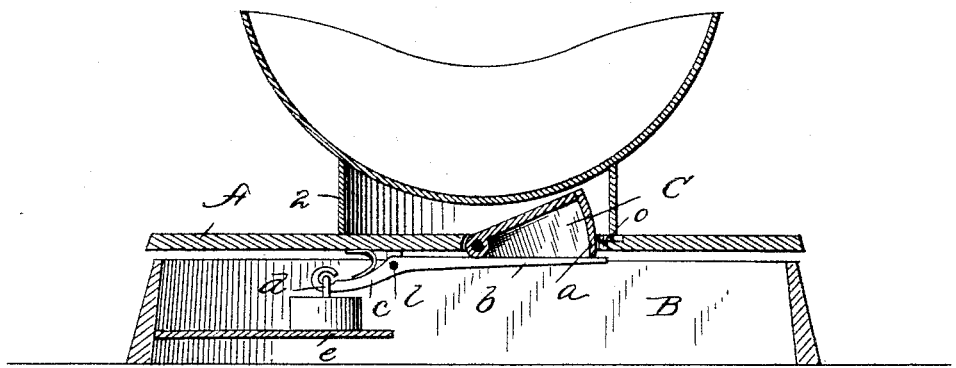
Figure 2:
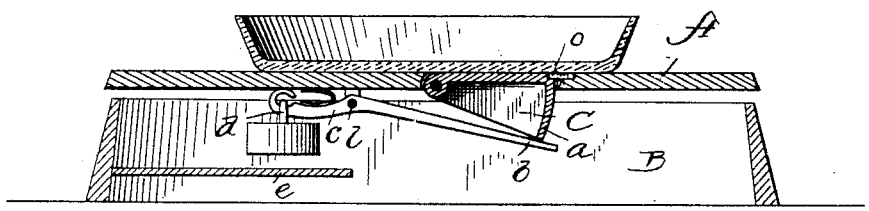

In the drawings, Figure 1 represents the platform of a scale in section with the scoop in place, and Fig. 2 is a view of the platform with a plate in place; but these figures do not show the levers connected to the scale-beam, these being omitted, as they form no part of the invention, and hence I deem it unnecessary to illustrate them.

It will be understood that while I have shown the invention as applied to the ordinary form of platform-scale, it may be applied to the scales of any construction in which a platform is used.

In the figures, A represents the platform, which is supported in the usual manner by the base B. In the center of the platform, preferably, but at any convenient position, a hinged section C is provided, fitting an opening in said platform, and this section has a flange on one edge extending downwardly, as shown at $a$. The normal position of the hinged section C is as shown in Fig. 1, the bottom edge of the flange $a$ being held up by a lever $b$, or it may be held up, if desired, by a spring and not engage with the lever $b$ until the weight is applied to the hinged section. The lever $b$ is pivoted at $l$ and has a curved downward extension $c$, terminating in a hook, which passes through the eye of a weight $d$. This weight represents the exact weight of the scoop, and may be adjusted to conform to the exact weight of different scoops, adding shot or like material, the weight being made hollow or with a cavity in its upper face for this purpose. Normally the end $c$ of the lever $b$ does not come in contact with the eye of the weight, the weight being supported upon an arm $e$, projecting from the base of the scale. In its normal position the hinged section is held up, as shown in Fig. 1, and the scoop, which has a supporting-flange 2 projecting below the bottom portion of the scoop, (this being the ordinary construction,) is placed on the platform so as to be above the hinged section C without coming in contact therewith. In this position the material may be weighed which is contained within the scoop without adjustment of the scales or without deducting the weight of the scoop, as it will be understood that the scales have been previously adjusted to allow for this weight. Suppose, however, that it is now desired to weigh an article which does not require the scoop. It is only necessary in this case to place it upon the hinged section, which will thus be depressed, and this depression will raise the arm $c$ of the lever, and with it the weight $d$; and as this weight equals the weight of the scoop it will be seen that the scales will require no adjustment on account of the scoop having been dispensed with in the weighing of the article. In case continued use of the scale should be found necessary without the scoop the hinged section C may be secured in its lowest position by means of a button $o$ or other fastening means to hold the section down.

I claim as my invention—

1. In combination with the platform of a scale, a movable section extending above the level of the platform, a weight normally supported out of engagement with the section, and connections between the section and weight, substantially as described.

2. In combination with a scale-platform, a movable section kept normally above the level of the platform, a pivoted lever extending between the section and a weight, the end of the said lever being hooked to engage the weight, a support for the weight whereby it is kept out of engagement with the lever normally, but is adapted to be lifted when the opposite end of the lever is depressed, substantially as described.

In testimony whereof I affix my signature in presence of two witnesses.

J. A. WERNER.

Witnesses:
W. M. DALGLIESH,
ALEX. MCGUNNEGLE.